United States Patent [19]

Cline et al.

[11] Patent Number: 5,247,634
[45] Date of Patent: Sep. 21, 1993

[54] METHOD OF MANAGING MEMORY ALLOCATION BY ASSOCIATION OF MEMORY BLOCKS WITH A TREE STRUCTURE

[75] Inventors: Robert C. Cline, Corvallis, Oreg.; Daniel Garfinkel, Fort Collins, Colo.

[73] Assignee: Hewlett-Packard Company, Palo Alto, Calif.

[21] Appl. No.: 496,482

[22] Filed: Mar. 20, 1990

[51] Int. Cl.[5] .............................................. G06F 12/02
[52] U.S. Cl. .............................. 395/425; 364/DIG. 1; 364/251.6; 364/245.1
[58] Field of Search ... 364/200 MS File, 900 MS File; 395/400, 425, 100 MS File

[56] References Cited

U.S. PATENT DOCUMENTS

| | | | |
|---|---|---|---|
| 4,468,728 | 8/1984 | Wang | 364/200 |
| 4,511,964 | 4/1985 | Goerge et al. | 395/400 |
| 4,725,742 | 2/1988 | Tachimori et al. | 307/449 |
| 4,845,678 | 7/1989 | Van Berkel et al. | 365/230.06 |
| 4,855,903 | 8/1989 | Carleton et al. | 364/200 |
| 4,992,962 | 2/1991 | Ishida et al. | 395/121 |
| 5,025,367 | 6/1991 | Gurd et al. | 364/200 |
| 5,109,336 | 4/1992 | Guenther et al. | 395/425 |
| 5,119,317 | 6/1992 | Narikawa et al. | 364/512 |

*Primary Examiner*—Joseph L. Dixon
*Assistant Examiner*—Hiep T. Nguyen

[57] ABSTRACT

A memory resource is managed by allocation of memory blocks within a larger free memory block to reduce fragmentation and provide efficient methods for consolidation of previously allocated memory blocks into larger free memory blocks.

22 Claims, 6 Drawing Sheets

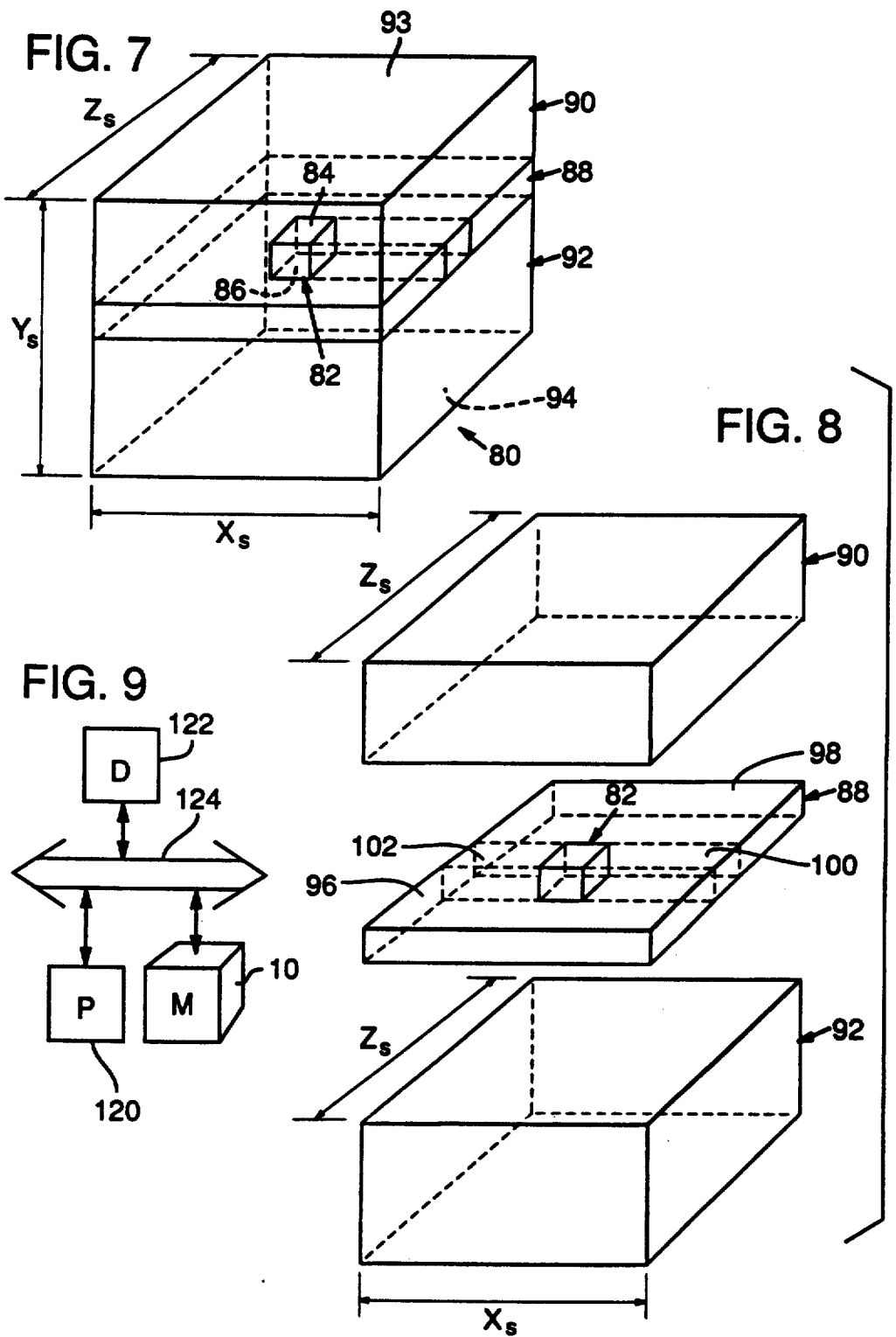

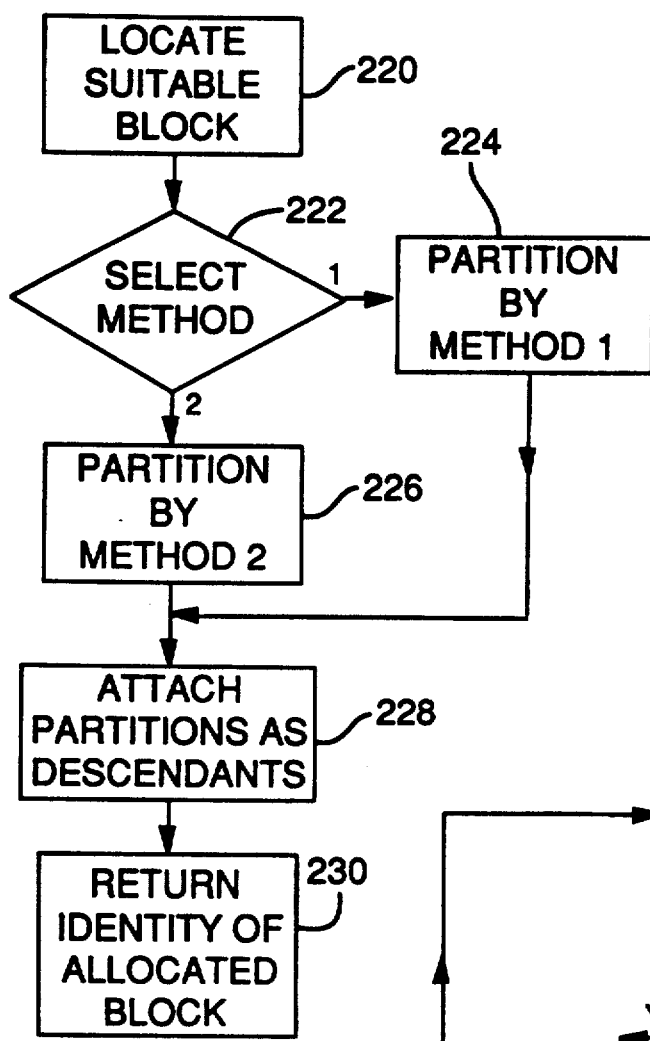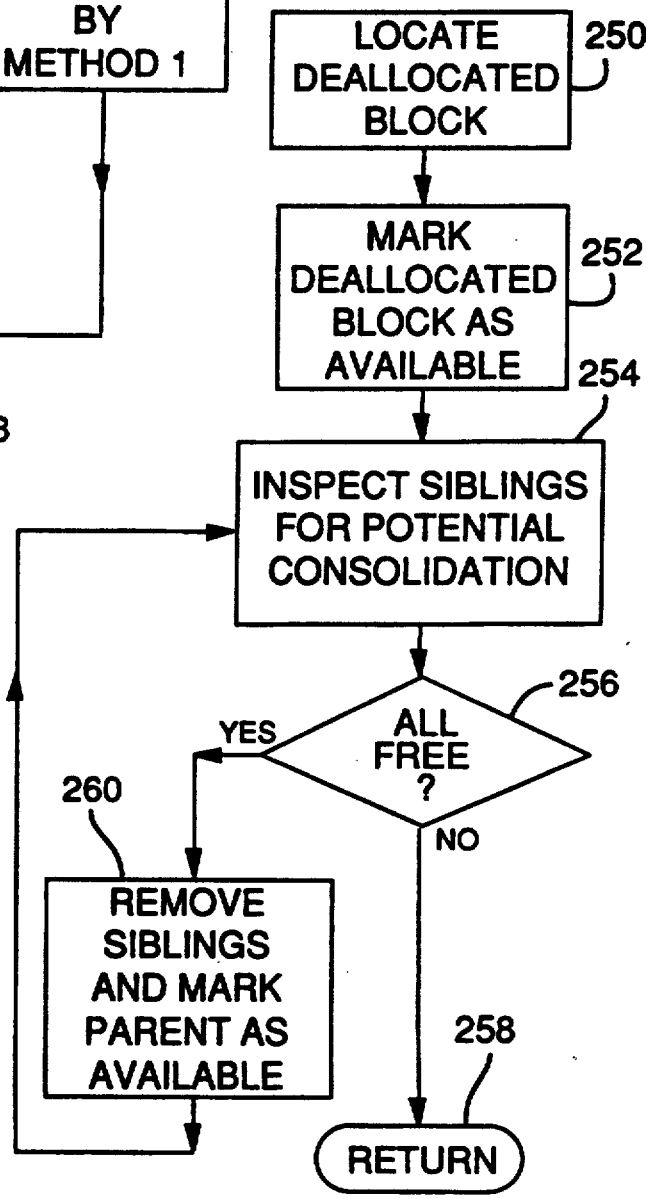

METHOD OF MANAGING MEMORY ALLOCATION BY ASSOCIATION OF MEMORY BLOCKS WITH A TREE STRUCTURE

BACKGROUND OF THE INVENTION

The present invention relates to resource management, and particularly to management of three dimensional resources, such as three dimensional memory space.

Memory space within a computer can be allocated for exclusive use by a particular application or process. Once the process is complete, the memory is deallocated and made available for subsequent allocation. Status information is maintained for each portion of the memory space. The status information indicates whether memory currently allocated, i.e., not available. When a process requires a block of memory, a suitable portion of available memory is first identified and then allocated to the process. Memory allocation is normally performed on a block basis where a block, i.e., a contiguous portion of memory locations, is allocated to a given process.

Management of a memory resource includes three basic operations: allocation, deallocation and consolidation. In the allocation phase, the computer receives a request for a block of memory, identifies a suitable non-allocated block of memory, and allocates the identified block by first marking the block as allocated and then communicating to the requesting process which block of memory is available for use. In the deallocation phase, the computer receives a communication indicating that a process is done with a previously allocated block of memory and then marks that block a being available for subsequent allocation.

In dividing or partitioning a memory resource for allocation, the computer necessarily fragments the memory into a number of blocks. If this process continues unchecked, eventually the memory is divided into many small blocks of memory and the computer is unable to satisfy allocation requests for memory portions larger than the largest fragment. Thus, in the consolidation phase, the computer attempts to join one or several contiguous blocks of available memory to form a larger contiguous memory block.

It may be appreciated that under this resource management scheme many different requesting processes have exclusive use of selected allocated portions of the memory resource. While some fragmentation of memory is inherent in allocation of memory blocks, it is advantageous to minimize the effect of such fragmentation by maximizing certain memory fragment dimensions. Also, it is desireable to provide efficient means for consolidating previously allocated blocks.

SUMMARY OF THE INVENTION

It is an object of the present invention to provide a method of efficiently allocating a memory block from a larger memory block. As applied to three dimensional memory, this method reduces memory fragmentation during the allocation phase of memory management.

It is a further object of the present invention to provide a method of associating memory blocks whereby blocks available for allocation are easily identified, currently allocated blocks are easily identified, and the process of consolidating previously allocated blocks into larger available blocks is achieved efficiently.

In accordance with a one embodiment of the present invention, a three dimensional block of free memory space is managed by selecting a portion of that memory space for allocation and dividing the remaining space into free memory blocks. The allocated block and the free memory blocks are then associated in a tree structure where the allocated block is the root element, and the remaining free blocks are the immediate descendants of the allocated block and equal siblings of one another. In this configuration, each leaf of the tree is available for allocation. In subsequent requests for memory allocation, reference to the leaves of the tree structure identifies free memory space. To allocate a block of memory from a leaf element, the block to be allocated from that leaf element is first identified and substituted for the original block in the tree structure with the remaining free blocks attached thereto as leaves. Again, all leaves of the tree structure remain available as free memory blocks.

In accordance with a second embodiment of the present invention, a three dimensional block of free memory space is managed by selecting a portion of that memory space for allocation and dividing the remaining space into free memory blocks. The allocated block and the remaining free memory blocks are then associated with the original block of memory in a tree structure where the original block of memory is the root element, and the allocated memory block together with the remaining free memory blocks are the immediate descendants thereof. In this configuration, all free and allocated memory space is found in the leaf elements of the tree structure. Thus, to allocate or deallocate memory, reference to the tree structure leaf elements identifies the relevant portions of memory for such procedures.

In accordance with one aspect of the present invention, when allocating a block of memory from a free memory block, the free memory block is first selectively divided into three major blocks in order to maximize particular dimensions thereof. One of the major blocks is then further partitioned into minor blocks with one minor block being the allocated block and the remaining minor blocks being additional free blocks after the allocation procedure.

The subject matter of the present invention is particularly pointed out and distinctly claimed in the concluding portion of this specification. Both the organization and method of operation of the invention, together with further advantages and objects thereof, however, may best be understood by reference to the following description and accompanying drawings wherein like reference characters refer to like elements.

BRIEF DESCRIPTION OF THE DRAWINGS

FIGS. 7 and 8 illustrate a second method of dividing the memory resource into major and minor blocks for allocation;

FIG. 9 is a computer system including the memory resource of FIG. 1, a processor, and a display device for practicing the method of three dimensional memory resource management;

FIG. 14 is a flow chart of an allocation routine used by the computer system of FIG. 9 in connection with the tree structure of FIG. 13; and FIG. 15 is a flow chart of a deallocation routine used by the computer system of FIG. 9 in connection with the tree structure of FIG. 13.

DETAILED DESCRIPTION OF THE PREFERRED EMBODIMENT

Figure 1:
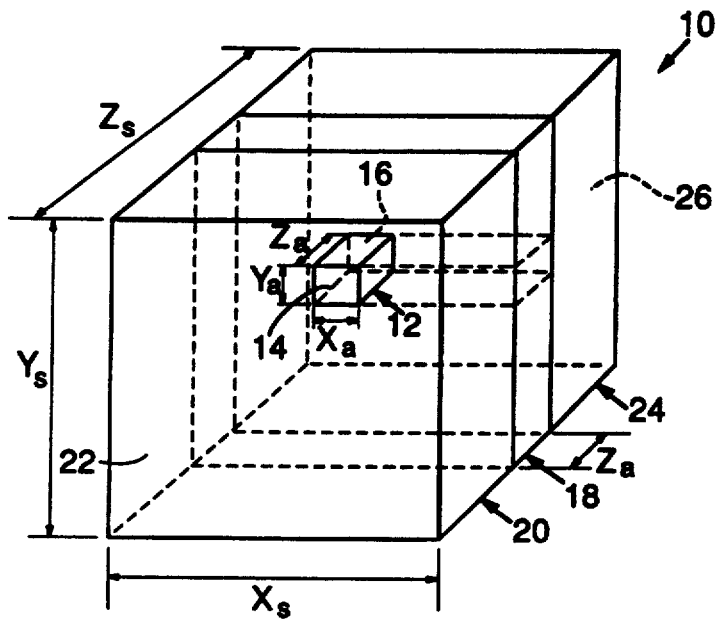
FIG. 1 illustrates a three dimensional memory resource and a first method of dividing that memory into major blocks for allocation.

With reference to FIG. 1, the method of three dimensional resource management will be described relative to a three dimensional memory space addressed by X, Y, and Z values. Such a memory space is useful in graphic displays where elements in an XY plane of the three dimensional space correspond to pixels of a display device, and each corresponding vector of Z values stores such information as pixel color or other screen attributes. This three dimensional memory space is managed by responding to allocation requests and providing contiguous blocks of such memory as allocated blocks for exclusive use. The following discussion will describe the method of managing such allocation requests for this three dimensional memory resource in accordance with the present invention. It will be recognized, however, that the invention is equally applicable to memory resources dimensioned in four or more dimensions.

In FIG. 1, a free memory block 10 has dimensions Xs, Ys, and Zs. For purposes of the present discussion, the block 10 is taken as the entire three dimensional memory space. However, block 10 is representative of any free portion of the three dimensional memory space. In either case, then, the block 10 is a free block, having no portions thereof allocated for use. An allocation block 12 having dimensions Xa, Ya, and Za must be allocated from the memory block 10. Block 12 may be needed, for example, to store a screen image for caching purposes. Other uses might include storage of screen text fonts. The position of block 12 within block 10 is determined by constraints imposed by the requesting process. For example, the requesting process may require allocation of a memory block having size dimensions Xa, Ya, and Za, e.g., sufficient to hold a screen image. Furthermore, the requesting process may require that one or all of the X, Y, or Z dimensions begin at particular address offsets. For example, the requesting process may require that the X and Y dimensions coincide with certain memory segment boundaries. Accordingly, the first step in allocating the block 12 from a portion of the block 10 is to determine the position of block 12 relative to address constraints imposed by the requesting process.

Once the position of block 12 within block 10 is determined, the remaining portions of block 10 must be partitioned and made available as free memory space in the event of subsequent memory allocation requests.

Memory block 10 is first divided into three major blocks, each having X and Y dimensions of Xs and Ys, respectively, and Z dimensions which sum to Zs. This partitioning can be visualized as two vertical slices along XY planes. More particularly, the vertical slices coincide with the front face 14 and rear face 16 of block 12 as viewed in FIG. 1. Thus, a middle block 18 includes the block 12 and has a Z dimension of Za. A front block 20 occupies the space between the front face 22 of block 10 and the front face 14 of block 12. A back block 24 occupies the space between rear face 16 of block 12 and the rear face 26 of block 10. Accordingly, the sum of the Z dimensions of the front block 20 and rear block 24 equal the value (Zs - Za).

FIG. 2 again illustrates the memory block 10, but broken into the major blocks 18, 20, and 24. It will be appreciated that the blocks 20 and 24 have X and Y dimensions of Xs and Ys, respectively, equal to the original block 10 and remain as free memory space.

Figure 2:
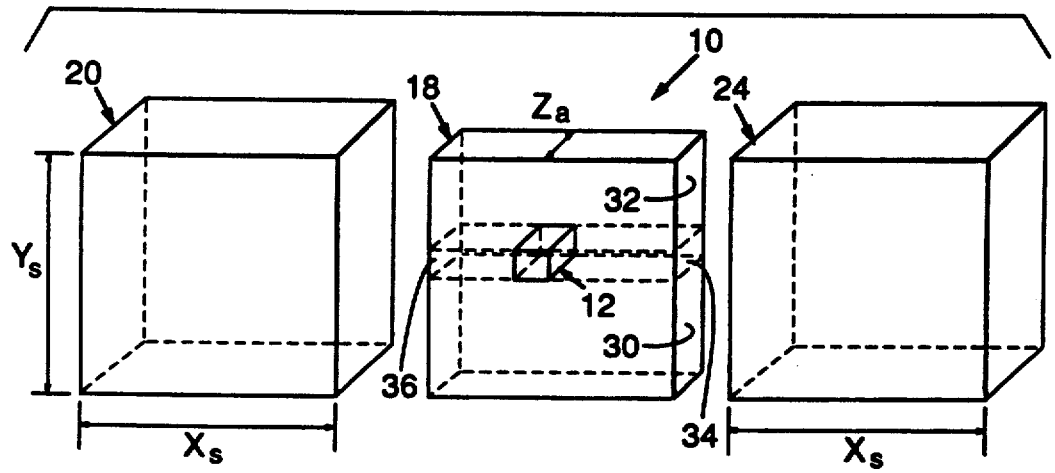
FIG. 2 illustrates the major blocks of FIG. 1 further divided into one allocated block and a number of remaining free minor blocks.

The middle block 18 is next divided into minor blocks 30, 32, 34, and 36. As seen in FIG. 2, the blocks 30 and 32 are those immediately below and above, respectively, block 12. The blocks 34 and 36 are those to the right and left, respectively, of block 12. It may be appreciated that, in so dividing block 18, the X dimensions of blocks 30 and 32 are fully maximized, i.e., equal to Xs. The smaller blocks 34 and 36 fill the remaining space adjacent block 12. Thus, in dividing block 10 into the major blocks 20 and 24 and into the minor blocks 30, 32, 34, and 36, X and Y dimensions of such blocks are maximized as will be more fully explained hereafter, other methods of partitioning block 10 may be used to selectively maximize other dimensions of the remaining free blocks.

It will be understood that in partitioning a given free memory block to obtain therefrom an allocated memory block, the allocated memory block may have one or more dimensions equal to the corresponding dimensions of the given free memory block. For example, if the dimension Za of block 12 was equal to Zs, then the front and rear blocks 20 and 24, respectively, would be null blocks with the memory block 10 being the same as the middle block 18. Null blocks are therefore maintained to preserve consistency within allocation algorithms. Accordingly, as used herein and in the appended claims, the term "memory block", and the like, shall refer to both memory blocks of non-zero dimensions and null memory blocks of zero dimension.

Figure 3:
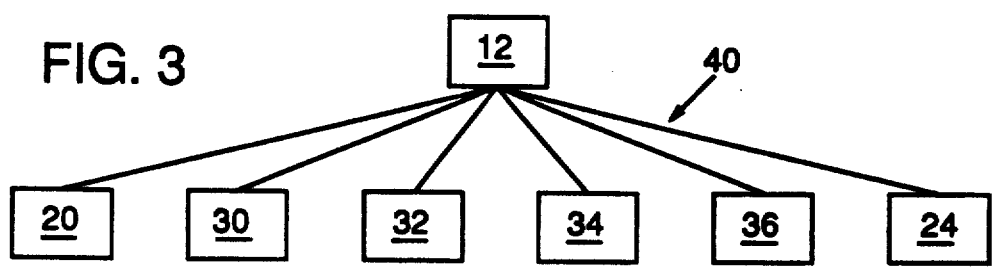
FIG. 3 illustrates a tree structure method of relating the major and minor blocks of FIG. 2 for later allocation and consolidation procedures.

Given the above method of allocating a block of memory from a free block and identifying the remaining free space, a method of associating all these blocks is needed. With reference to FIG. 3, the allocated block 12 is taken as a root element of a tree structure 40 and each of the blocks 20, 24, 30, 32, 34, and 36 are attached as immediate descendants, and siblings of one another. It will be understood that each of the blocks 20, 30, 32, 34, 36, and 24 may be later taken as free blocks for subsequent allocation and divided in accordance with the method described in conjunction with FIGS. 1 and 2.

For example, a subsequent allocation request may specify a block of memory which may be taken from block 20. The requesting process may specify size, memory offsets, or other such constraints which, it is determined, can be satisfied by a block of memory taken from block 20.

Figure 4:
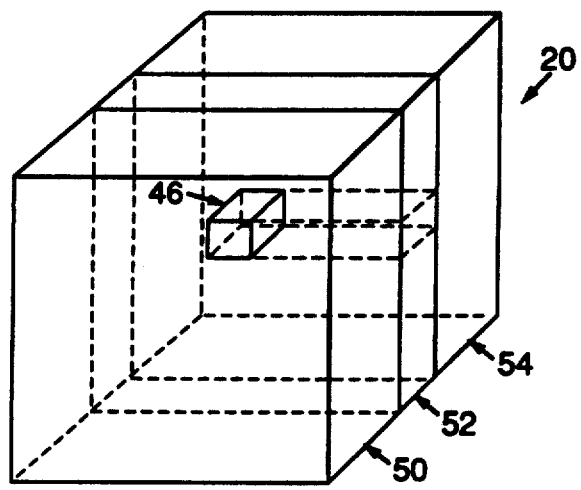
FIGS. 4 and 5 illustrate further division of the memory resource.
Figure 5:
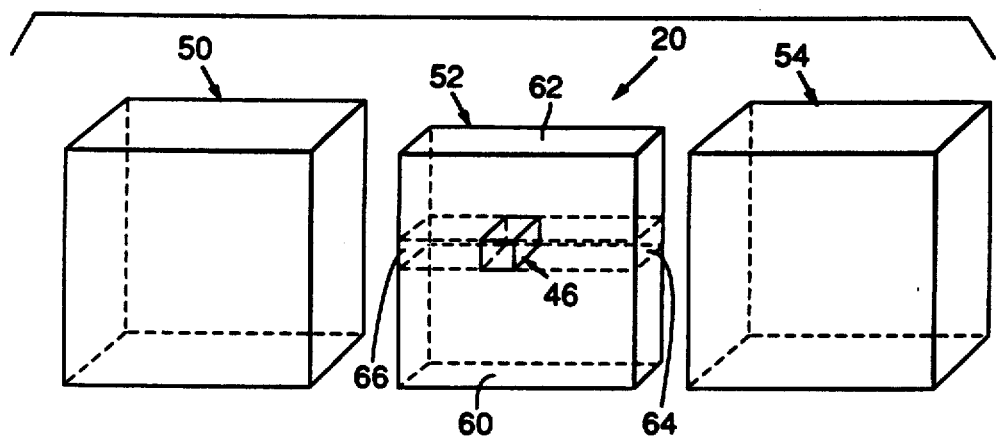

With reference to FIGS. 4 and 5, the position of block 46 within block 20 is established in accordance with such external constraints. Block 20 is then divided into major and minor blocks, as described in connection with the division of block 10 in FIGS. 1 and 2. Block 20 is first divided into three major blocks 50, 52 and 54. More particularly, block 20 is divided into a front block 50, a middle block 52 containing the block 46, and a rear block 54. Middle block 52 is then divided into minor blocks 60, 62, 64, and 66. The division of block 52 then corresponds to the division of block 18 in FIG. 2 where blocks 60, 62, 64, and 66 correspond to the blocks 30, 32, 34, and 36, respectively.

Figure 6:
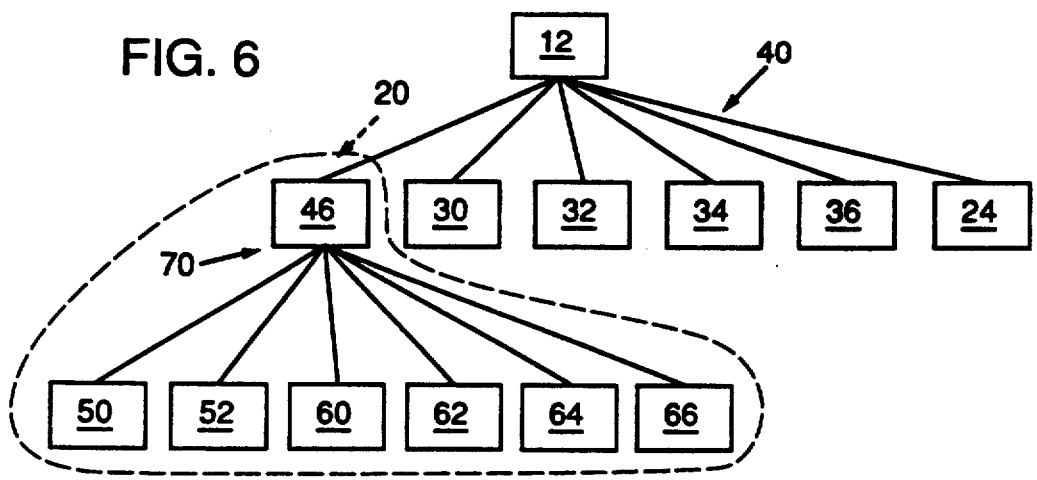
FIG. 6 further illustrates the tree structure method of relating free and allocated blocks of the memory resource.

FIG. 6 illustrates the incorporation of the newly divided block 20 into the tree structure 40. In FIG. 6, the allocated block 46 is attached as an immediate descendant to the allocated block 12 and takes the place of the block 20 as seen in FIG. 3. The major blocks 50 and 52, along with the minor blocks 60, 62, 64, and 66, are attached to block 46 as immediate descendants and siblings of one another. It may, therefore, be appreciated that a subtree structure 70, having the block 46 as its root and the blocks 50, 52, 60, 62, 64, and 66 as its descendants, now represents the block 20 in the tree structure 40 of FIG. 6. It will be further appreciated that the configuration of tree structure 40, as seen in FIG. 6, includes as leaf elements the blocks 50, 52, 60, 62, 64, 66, 30, 32, 34, 36, and 24 as free blocks remaining available for allocation.

Thus, tree structure 40 may be traversed to identify leaf elements and thereby identify free memory blocks. Furthermore, it will be appreciated that upon deallocation of a given memory block, it is possible to immediately determine whether the associated free blocks, i.e., those blocks remaining after the given block was allocated, may be coalesced into a larger block for subsequent allocation.

For example, consider deallocation of the block 46. Upon determining that the block 46 is to be deallocated, it is possible to identify the immediate descendants of block 46 and determine whether block 46 may be consolidated back into the block 20. More particularly, if block 46 has as all of its immediate dependents leaf elements, it is known that these elements may be coalesced into a contiguous block of memory, including block 46. This new block of memory is the original block 20. In such case, the tree structure 40 returns to its condition as illustrated in FIG. 3. Similarly, upon subsequently determining that block 12 is to be deallocated, it is possible to identify all its immediate descendants as free memory space, i.e., leaf elements, and consolidate blocks 12, 20, 30, 32, 34, 36, and 24 into the original memory block 10.

In accordance with the above process, a simple tree structure is obtained where allocated blocks are always related to the free blocks resulting from the allocation process. In this tree, all nodes are blocks potentially in use and all leaves are free blocks. As blocks are freed, the tree shrinks when leaves are combined with nodes. As blocks are used, the tree grows and nodes are created with their attendant free block leaves. For efficiency of access, the processing algorithm threads the tree, such that lists of free blocks of allocated blocks are maintained. This tree data structure has the advantages of simplicity and ease of use. It relates all the components or fragments of memory in an orderly fashion allowing for efficient consolidation.

FIGS. 7 and 8 illustrate a second method of dividing a memory block into major and minor blocks. In the method of FIGS. 7 and 8, the Z and X dimensions are maximized in creating major blocks and minor blocks. More particularly, consider a memory block 80 from which an allocated block 82 is to be partitioned for allocation. In dividing memory block 80 into three major blocks, horizontal slices through XZ planes coincide with the top face 84 and bottom face 86 of block 82. More particularly, a middle block 88 contains the block 82, a top block 90 occupies the space between top face 84 of block 82 and top face 93 of block 80, and a bottom block 92 occupies the space between bottom face 86 of block 82 and bottom face 94 of block 80. Thus, in partitioning block 80 into the major blocks 88, 90, and 92, the X and Z dimensions of blocks 90 and 92 equal Xs and Zs, respectively, i.e., the X and Z dimensions of original block 80. Middle block 88 is then further divided into minor blocks 96, 98, 100, and 102. As seen in FIG. 8, the block 96 lies in front of the block 82 and the block 98 lies behind the block 82. Accordingly, the X dimensions of blocks 96 and 98 are maximized, i.e., equal to Xs, the X dimension of original block 80. Blocks 100 and 102 occupy the remaining space of middle block 88.

Thus, it will be appreciated that memory blocks may be selectively divided in order to maximize particular dimensions. Determining the appropriateness of each method depends on the nature of how memory is to be allocated in general. If allocations have completely random depths, i.e., Z dimensions, there may be no reason to use any method other than the method described in connection with FIGS. 7 and 8. If, however, a majority of the allocations are full depth allocations, i.e., equal to Xs, the method described in connection with FIGS. 1 and 2 should be used in conjunction with the method described in conjunction with FIGS. 7 and 8 to cut down on memory fragmentation due to partial depth allocations.

When a majority of memory allocations are full depth, the localization of partial depth allocations greatly cuts down on memory fragmentation. Each isolated allocation of a partial depth block relegates an area of memory useful only for other allocations of partial, depth blocks. Future allocations of partial depth blocks should take advantage of these available partial depth spaces, instead of allocating out of full depth spaces. To maximize the potential for doing this, the method described in connection with FIGS. 1 and 2 can be used to set up suitable free space in conjunction with the method described in connection with FIGS. 7 and 8.

The two methods can be combined in the following manner. When a free block is taken for a use that is of full depth, then the method of FIGS. 7 and 8 should be used, since most of the resulting free blocks will also be of full depth. When a free block of partial depth is taken for use, the method of FIGS. 1 and 2 should be used. Using the method of FIGS. 1 and 2 leaves at least two large (in X and Y dimensions) partial depth blocks that are more likely to be used in future partial depth allocations. If the method of FIGS. 7 and 8 is used, one obtains only small partial depth blocks. Thus, by maximizing the XY area of partial depth blocks, it is more likely that such blocks can be efficiently used in future partial depth allocations. This combination of methods improves the maximum availability of full depth memory block and maximizes the potential for "stacking" partial depth allocations in localized areas. Certain portions of tree structure 40 may be accessed for partial depth memory allocation, whereas other portions of tree structure 40 contain full depth memory blocks.

It will be appreciated that the determination as to whether the method of FIGS. 1 and 2 or the method of FIGS. 7 and 8 is used will depend on how memory is used globally. For example, if text screen fonts are stored in horizontal strings of characters requiring large X dimensions, it is advantageous to have available memory blocks maximized in the X dimension. Similarly, if full depth memory blocks are required for screen image caching, it is advantageous to have available memory blocks maximized in the Z dimension. Accordingly, it will be appreciated that for a given installation, various criteria may be applied with reference to the type of memory allocation request in determining which method of memory division is to be used. Furthermore, it will be understood that while maximization in the XY dimensions and the XZ dimension has been shown, similar maximization in the ZY dimensions is possible.

FIG. 9 illustrates a computer, including a processor 120, a display device 122 and the three dimensional memory space 10. Processor 120, display device 122, and memory 10 communicate by way of a bus 124. In operating the display device 122, processor 120 makes use of memory space 10 for storing screen images and text font data. In managing such use of memory space 10, processor 120 performs the tasks of memory allocation, deallocation, and consolidation. For example, processor 120 may require a number of text screen fonts for use on display 122. In loading such text screen fonts into memory 10, memory allocation is required. Certain portions of memory 10 are then dedicated to the storage of such text screen fonts. Also, processor 120 may require caching of screen images in memory 10 for temporary storage. In loading such text screen fonts and moving screen images within memory space 10, memory space 10 is dynamically partitioned into allocated and free memory space in accordance with the present invention.

Figure 10:
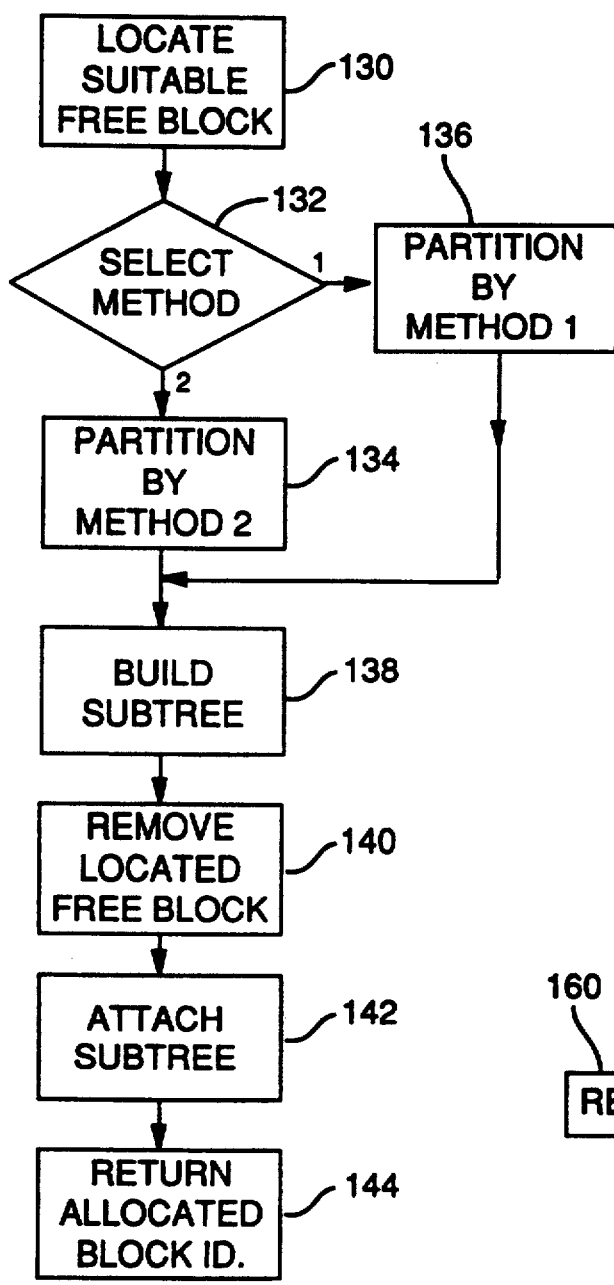
FIG. 10 is a flow chart of an allocation routine used by the computer system of FIG. 9.

FIG. 10 illustrates an allocation routine used by processor 120 in allocating a portion of memory space 10. In block 130 of FIG. 10, processor 120 locates a suitable free block in memory space 10. In locating such suitable free block, processor 120 threads the tree structure 40 in order to find an available block of memory.

Processor 120 may determine that partitioning in accordance with the method described in FIGS. 1 and 2 is appropriate and processing branches from block 132 to block 136 where the located free block is so partitioned. In the alternative, it may be determined that partitioning according to the method of FIGS. 7 and 8 is preferred in which case processing advances from block 132 to block 134 where the located free block is so partitioned.

Processing continues from blocks 134 and 136 to block 138 where processor 120 builds a subtree structure. The subtree structure includes as its root the allocated block of memory taken from the located free block and has its immediate descendants leaf elements comprising free memory space. Processing then continues to block 140 where processor 120 removes the located free block from the tree structure 40. Continuing to block 142, processor 120 then attaches the newly constructed subtree structure to the tree structure 40 in place of the removed block as described in connection with FIG. 6. Finally, in block 144, processor 120 returns to the requesting process an identification of the block allocated for its use.

Figure 11:
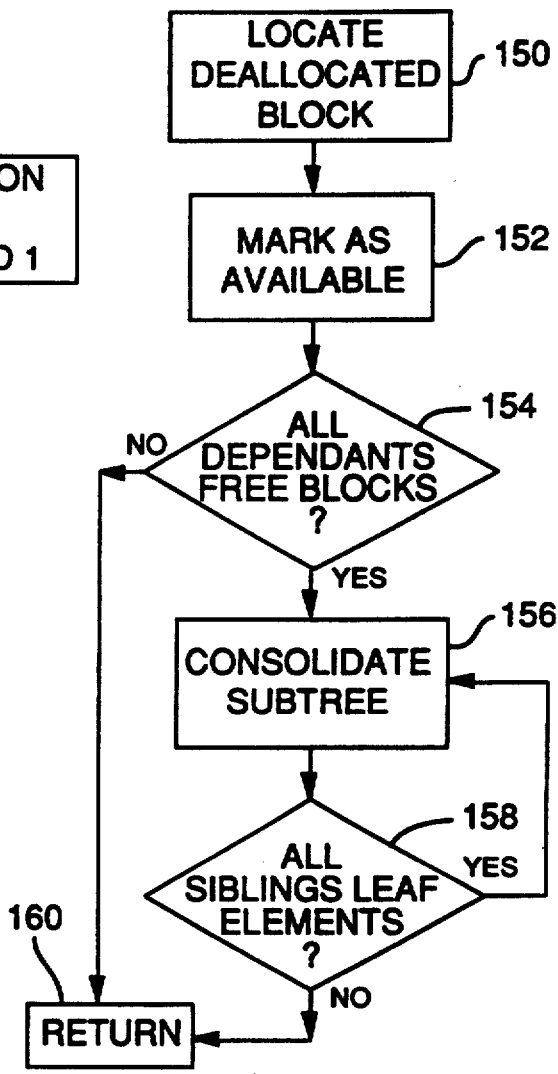
FIG. 11 is a flow chart of a deallocation routine used by the computer system of FIG. 9.

FIG. 11 illustrates a deallocation procedure used by processor 120 in making available, as free memory space, previously allocated memory blocks. In block 150, processor 120 locates the memory block to be deallocated. More particularly, the deallocation procedure of FIG. 11 receives an identification of a memory block which is to be deallocated. Processor 120 then locates the identified deallocated block within the tree structure 40. In block 152, processor 120 marks, as available memory space, the located deallocated memory block.

Processing continues to decision block 154 where processor 120 determines whether the located deallocated memory block has its dependents free blocks. More particularly, processor 120 determines whether all the dependents of the located deallocated block are leaf elements. If all such dependents are leaf elements, processing continues to block 156 where processor 120 consolidates the tree structure comprising the located deallocated block and its immediate descendants into a single memory block. The subtree structure is then removed from tree structure 40 and the single consolidated memory block is substituted therefore.

Processing then continues to block 158 where processor 120 determines whether further consolidation is possible. Processor 120 determines whether the newly substituted memory block is the dependent of a parent block having all dependents as free blocks. In other words, processor 120 determines whether the newly inserted memory block has all leaf elements as its siblings. If the newly substituted memory block has all leaf elements as its siblings, processing returns to block 156 where consolidation of the parent of that newly substituted block, together with the descendant leaf elements, occurs. If, in block 158, it is determined that the newly substituted memory block does not have all leaf elements as its siblings, processing branches to return block 160.

Returning to decision block 154, if, after marking the located deallocated block as available, it is determined that the located block does not have all leaf elements as its dependents, processing branches from block 154 to return block 160.

Figure 12:
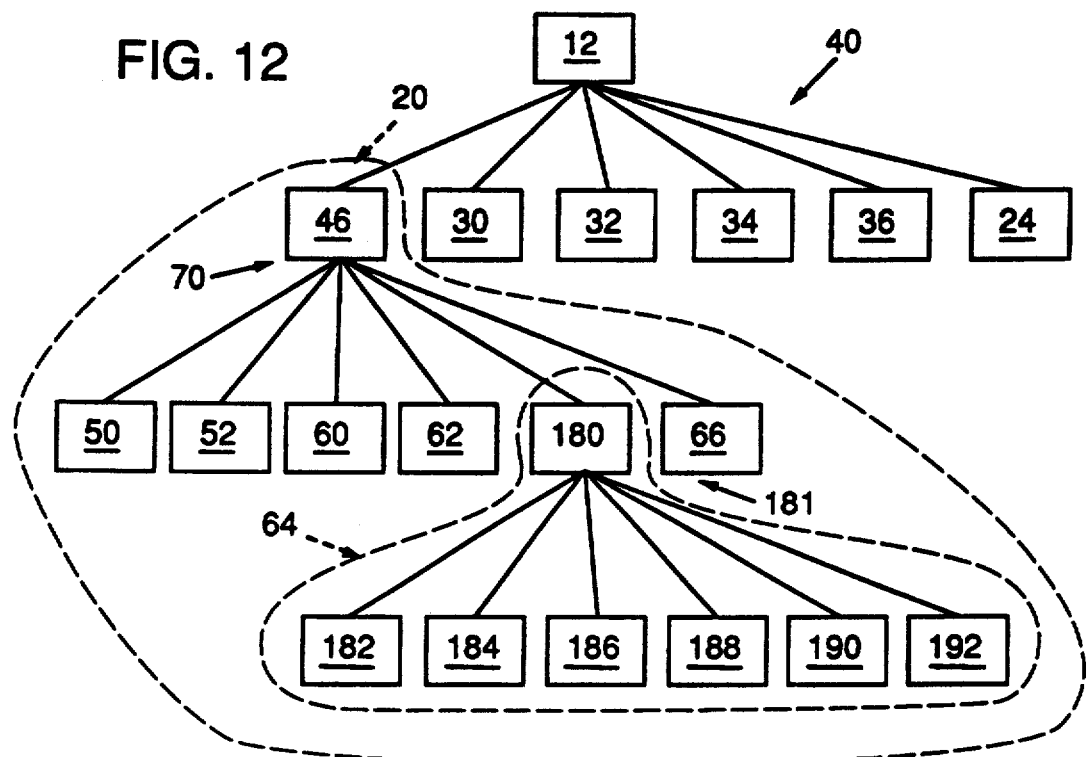
FIG. 12 illustrates tree structure method of relating memory blocks including deallocation and consolidation relative to that tree structure.

FIG. 12 illustrates the deallocation of memory blocks of the tree structure 40. Consider the tree structure 40 as presented in FIG. 6, but with the further allocation of a block 180 from block 64. Following such allocation, a subtree structure 181 having the block 180 as its root element, and the free memory blocks 182, 184, 186, 188, 190, and 192 as its dependents, forms a portion of tree structure 40. The allocated block 180 is attached as a descendant node of block 46.

In accordance with this method of the present invention, all leaf elements of tree structure 40 remain as available free memory space, while node elements, i.e., non-leaf elements, represent potentially allocated memory blocks. Given this configuration of tree structure 40, consider the deallocation of memory block 180. Upon locating the block 180 in tree structure 40, it is determined that block 180 has as its dependents all leaf elements. Accordingly, the subtree structure representing the block 64 may be consolidated back into the block 64 and attached as a leaf element to the block 46. Upon subsequent deallocation of the block 46, the subtree structure representing the block 20 may be consolidated back into the block 20 and attached as a leaf element of the block 12.

In another deallocation scenario, taking the tree structure 40 as represented in FIG. 12, consider deallocation of the block 46. Upon locating the block 46 for deallocation, processor 120 determines that block 46 does not have all leaf elements as its dependents. Block 46 is, however, marked as available memory space in the event that upon later deallocation of block 180, the subtree structure having its root as block 46 may be consolidated into the block 20 and attached as a leaf element of block 12.

Figure 13:
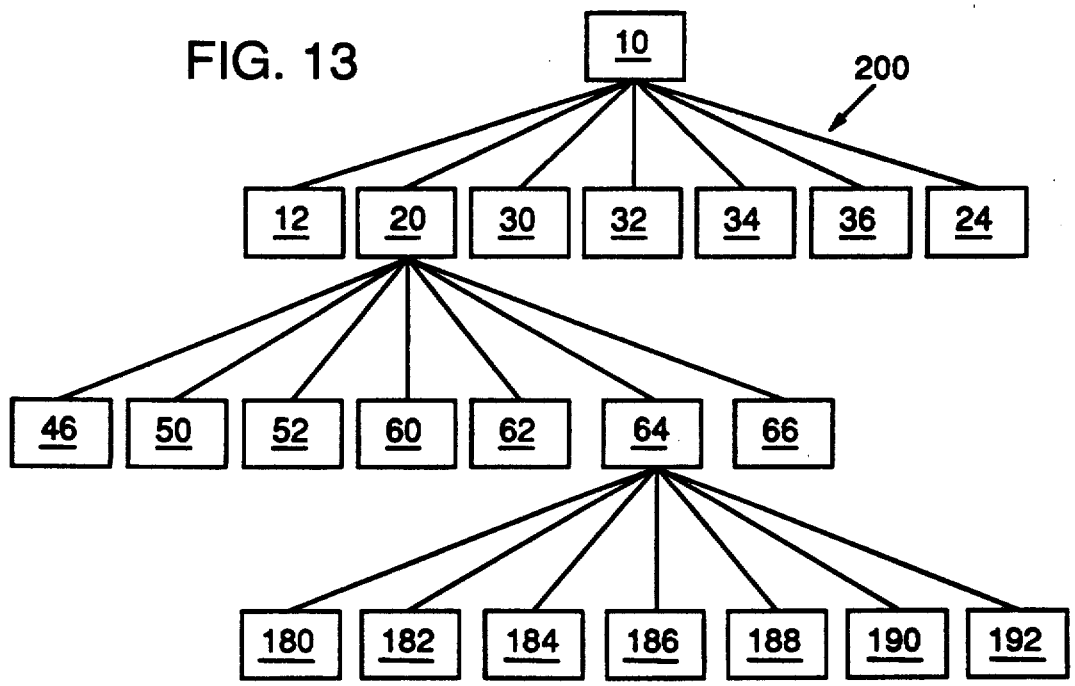
FIG. 13 illustrates a second tree structure method of relating free and allocated blocks of the memory resource.

FIG. 13 illustrates a second method of maintaining a tree structure 200 for associating the free and allocated memory blocks of memory block 10. More particularly, the tree structure 200 of FIG. 13 represents the same state of memory 10 as depicted in FIG. 12, but employs a different tree structure method. In using the tree structure 200, memory partitioning in response to a given allocation request is similar. In other words, for each memory allocation request, a suitable block of free memory is first identified and then partitioned into seven memory blocks, one allocated block and six free blocks according to a partitioning method for maximizing selected dimensions. The tree structure 200 differs from the previously described tree structure 40 in that each of the seven blocks of memory so partitioned is represented as a separate descendent from the original free memory block.

This second method of maintaining a tree structure representing memory allocation status is desirable because a given tree node, representing a previously allocated but currently available memory block, may be again partitioned without first memory block represented by its descendant tree elements.

For example, in partitioning the memory block 10 into the allocated memory block 12 and the free memory blocks 20, 30, 32, 34, 36, and 24, tree structure 200 maintains a root element representing the block 10 and attaches to that root element seven descendants, each corresponding to one of the memory partitions created in allocating the memory block 12 therefrom. Furthermore, in allocating the memory block 46 from the memory block 20, leaf elements corresponding to the allocated block and the free blocks 50, 52, 60, 62, 64, and 66 are attached as descendants to the tree element representing the block 20. Finally, in allocating the memory block 180 from the memory block 64, seven descendent leaf elements are attached to the tree element representing the block 64. One of the seven such leaf elements attached to block 64 is the allocated block 180 and the remaining six descendants represent the free memory blocks 182, 184, 186, 188, 190, and 192.

It may be appreciated that in utilizing the tree structure 200, not all leaf elements represent free memory space. However, all allocated and free memory space is represented as leaf elements of the tree structure 200. Thus, in using the tree structure 200 as shown in FIG. 13, each leaf element is marked as representing either free memory space or allocated memory space. It is suggested that in manipulating the tree structure 200, lists of allocated and free memory space be maintained in order to efficiently thread the tree structure 200.

FIG. 14 illustrates an allocation routine used for the tree structure 200. In block 220 of FIG. 14, processor 120 locates a suitable free block in, for example, memory space 10 as described herein above. In block 222, processor 120 determines a method of memory partitioning in accordance with external constraints as described previously. The located free block is so partitioned in one of process blocks 224 and 226 in accordance with a selected method of partitioning to maximize certain dimensions if remaining free memory. Processing then proceeds to block 228 where processor 120 attaches leaf elements to the tree structure element representing the located free block. More particularly, processor 120 attaches seven leaf elements to the tree element representing the located free block. One such leaf element represents the allocated memory block as taken from the located free block. The remaining six leaf elements represent the six remaining free memory blocks of the located free block as provided in the partitioning of the located free block. Each of the seven leaf elements are then marked as representing allocated or free memory space accordingly. Finally, in block 230, processor 120 returns to the requesting process an identification of the block allocated for use.

FIG. 15 illustrates a deallocation procedure used by processor 120 in connection with the tree structure 200. In block 250 of FIG. 15, processor 120 locates the identified deallocated memory block. Then, in block 252 processor 120 marks the located deallocated memory block as available memory space. Processing continues to block 254 where processor 120 inspects the siblings of the located deallocated block for purposes of potential consolidation. Based on its inspection of such siblings, processor 120 determines in decision block 256 whether all the siblings of the located deallocated block are marked as representing free memory space. If this test returns a negative result, processing branches to return block 258. Otherwise, upon determining that all siblings of the located deallocated block represent free memory space, in block 260 processor 120 removes such siblings from tree structure 200 and marks the parent of such siblings as representing free memory space. Processing then returns to block 254 where the parent of the located deallocated block is taken as the current located block. In block 254 the siblings of such current located block are inspected for potential consolidation with continued processing then proceeding to decision block 256 as described above. In this manner, all portions of the tree structure 200 representing free space following a given deallocation are consolidated by removing groups of siblings representing free space.

In maintaining the tree structure 40, it is possible to maintain lists of the available free memory and allocated memory in determining where memory may be allocated. Memory may be allocated from any leaf element of tree structure 40 and from any node element of tree structure 40 marked as being available.

Thus, a method of three dimensional resource management has been shown and described. In accordance with this method, three dimensional memory space may be managed in responding to allocation, deallocation, and consolidation procedures.

While a preferred embodiment of the present invention has been shown and described, it will be apparent to those skilled in the art that many changes and modifications may be made without departing from the invention in its broader aspects. The appended claims are, therefore, intended to cover all such changes and modifications as fall within the true spirit and scope of the invention.

We claim:

1. A method of associating free and allocated memory blocks within an at least three dimensional computer memory, the method comprising:

allocating a first memory block of said computer memory and partitioning the remaining portion of said computer memory into a plurality of free memory blocks; and associating said first memory block and said plurality of free memory blocks with a tree structure where a root element represents said first memory block and leaf element descendants of said root element represent said plurality of free memory blocks, and where said root element is marked as representing an allocated memory block and each leaf element descendant is marked as representing a free memory block.

2. The method according to claim 1 further comprising the steps:

allocating a second memory block from a given memory block selected from said plurality of free memory blocks and represented by a given leaf element of said tree structure, and partitioning the remaining portion of said given memory block into a second plurality of free memory blocks;

associating said second memory block and said second plurality of free memory blocks with a subtree structure wherein said second memory block is represented by a root element of said subtree structure marked as representing an allocated memory block, and wherein said second plurality of free memory blocks are represented by leaf element descendants of said subtree root element, each of said last mentioned leaf elements being marked as representing a free memory block; and substituting said subtree structure for said given leaf element in said tree structure.

3. The method according to claim 2 further comprising the steps:

deallocating an identified, allocated memory block of said computer memory by locating a corresponding element of said tree structure and marking said corresponding tree structure element as representing a free memory block;

inspecting descendants of said located corresponding tree structure element to determine whether all descendants of said located corresponding tree structure element are leaf elements; and, if all descendants of said located corresponding tree structure element are leaf elements, removing from said tree structure a subtree structure having said located corresponding tree structure element as its root element and replacing said last mentioned subtree structure with a first new leaf element marked as representing a free memory block corresponding to memory represented by said last mentioned subtree structure.

4. The method according to claim 3 further comprising the steps:

inspecting, within said tree structure, siblings of said first new leaf element to determine whether all such siblings are leaf elements; and, if all such siblings are leaf elements, removing from said tree structure a subtree structure having as its root element the parent of said first new leaf element and of said siblings and replacing therefor a second new leaf element marked as representing available memory corresponding to the memory represented by said last mentioned subtree structure.

5. The method according to claim 1 wherein said step of allocating a first memory block of said computer memory and partitioning the remaining portion of said computer memory comprises the step of selectively partitioning such remaining portion to maximize selected dimensions of ones of said plurality of free memory blocks.

6. The method according to claim 5 wherein said remaining portions are partitioned to maximize selected dimensions of said plurality of free memory blocks relative to the dimensions of said computer memory.

7. The method according to claim 6 wherein said computer memory is memory having dimensions $X_s$, $Y_s$ and $Z_s$, and said step of selectively partitioning comprises the steps:

receiving an allocation request for a block of memory having dimensions $X_a$, $Y_a$ and $Z_a$, each of the dimensions $X_a$, $Y_a$, and $Z_a$ being less than or equal to the corresponding one of the dimensions $X_s$, $Y_s$, and $Z_s$;

partitioning said computer memory into three contiguous major blocks each having a first two of its X, Y and Z dimensions equal to corresponding dimensions of said computer memory, a first major block having a remaining one of its X, Y and Z dimensions equal to the corresponding one of dimensions $X_a$, $Y_a$ and $Z_a$;

partitioning the first major block into five minor blocks, the first minor block having X, Y and Z dimensions equal to $X_a$, $Y_a$ and $Z_a$, respectively, the second and third minor blocks having one of said first two dimensions equal to the corresponding one of dimensions $X_s$, $Y_s$ and $Z_s$, the fourth and fifth minor blocks occupying the remainder of said computer memory; and allocating the first minor block in response to said allocation request.

8. The method according to claim 1 wherein at least one of said plurality of memory blocks is a null memory block.

9. A method of associating free and allocated memory blocks within an at least three dimensional computer memory, the method comprising:

allocating a first memory block of said computer memory and partitioning the remaining portion of said computer memory into a plurality of free memory blocks; and associating said first memory block and said plurality of free memory blocks with a tree structure wherein said computer memory is represented by a root element of said tree structure, and wherein said allocated memory blocks and said plurality of free memory blocks are represented by leaf element descendants of said root element, the leaf element descendant corresponding to said allocated memory block being marked as representing allocated memory, the leaf element descendants corresponding to said plurality of free memory blocks being marked as representing free memory.

10. The method according to claim 9 further comprising the steps:

allocating a second memory block from a given memory block selected from said plurality of free memory blocks and represented by a given leaf element of said tree structure marked as representing free memory, and partitioning the remaining portion of said given memory block into a second plurality of free memory blocks;

associating said second memory block and said second plurality of free memory blocks with corresponding tree structure leaf elements attached as descendant to said given leaf element, the leaf element representing said second memory block being marked as representing an allocated memory block, the leaf elements representing said second plurality of memory blocks being marked as representing free memory.

11. The method according to claim 10 further comprising the steps:
deallocating an identified, allocated memory block of said computer memory by locating a corresponding tree structure leaf element and marking said corresponding tree structure element as representing free memory;
inspecting, within said tree structure, siblings of said leaf element representing said identified memory block to determine whether all such siblings represent free memory space; and,
if all such siblings represent free memory space, removing all such siblings from said tree structure and marking the parent tree structure element as representing free memory.

12. The method according to claim 9 wherein said step of allocating a first memory block of said computer memory and partitioning the remaining portion of said computer memory comprises the step of selectively partitioning such remaining portion to maximize selected dimensions of ones of said plurality of free memory blocks.

13. The method according to claim 12 wherein said remaining portions are partitioned to maximize selected dimensions of said plurality of free memory blocks relative to dimensions Xs, Ys and Zs of said computer memory.

14. The method according to claim 13 wherein said computer memory is a memory having dimensions Xs, Ys and Zs, and said step of selectively partitioning comprises the steps:
receiving an allocation request for a block of memory having dimensions Xa, Ya and Za, each of the dimensions Xa, Ya, and Za being less than or equal to the corresponding one of the dimensions Xs, Ys, and Zs;
partitioning said computer memory into three contiguous major blocks each having a first two of its X, Y and Z dimensions equal to corresponding dimensions of said computer memory, a first major block having a remaining one of its X, Y and Z dimensions equal to the corresponding one of dimensions Xa, Ya and Za;
partitioning the first major block into five minor blocks, the first minor block having X, Y and Z dimensions equal to Xa, Ya and Za, respectively, the second and third minor blocks having one of said first two dimensions equal to the corresponding one of dimensions Xs, Ys and Zs, the fourth and fifth minor blocks occupying the remainder of said computer memory of dimensions Xs, Ys and Zs; and
allocating the first minor block in response to said allocation request.

15. The method according to claim 9 wherein at least one of said plurality of memory blocks is a null memory block.

16. A method of allocation within a three dimensional block of free memory space having dimensions Xs, Ys and Zs, the method comprising:
receiving an allocation request for a block of memory having dimensions Xa, Ya and Za, each of the dimensions Xa, Ya, and Za being less than or equal to the corresponding one of the dimensions Xs, Ys, and Zs;
partitioning said computer memory into three contiguous major blocks each having a first two of its X, Y and Z dimensions equal to corresponding dimensions of said computer memory, a first major block having a remaining one of its X, Y and Z dimensions equal to the corresponding one of dimensions Xa, Ya and Za;
partitioning the first major block into five minor blocks, the first minor block having X, Y and Z dimensions equal to Xa, Ya and Za, respectively, the second and third minor blocks having one of said first two dimensions equal to the corresponding one of dimensions Xs, Ys and Zs, the fourth and fifth minor blocks occupying the remainder of said computer memory of dimensions Xs, Ys and Zs; and
allocating the first minor block in response to said allocation request.

17. The method according to claim 16 further comprising the step of associating said blocks, said associating step comprising representing the first minor block as a root element of a tree structure and representing each of the second and third major blocks and each of the second, third, fourth and fifth minor blocks with leaf elements, said leaf elements being descendants of said root element.

18. The method according to claim 17 wherein said leaf elements are siblings within said tree structure, each being a direct descendent of said root element.

19. The method according to claim 16 further comprising the step of associating said blocks, said associating step comprising representing said free memory space as a root element of a tree structure and attaching leaf element descendants thereto each representing one of said second and third major blocks and said minor blocks.

20. The method according to claim 19 wherein said leaf elements are siblings within said tree structure, each being a direct descendant of said root element.

21. The method according to claim 20 further comprising the step of marking the leaf element corresponding to said allocated memory block as representing allocated memory, and marking the remaining leaf elements as representing free memory.

22. The method according to claim 16 wherein at least one of said major and minor blocks is a null block.

* * * * *